United States Patent Office 3,567,529
Patented Mar. 2, 1971

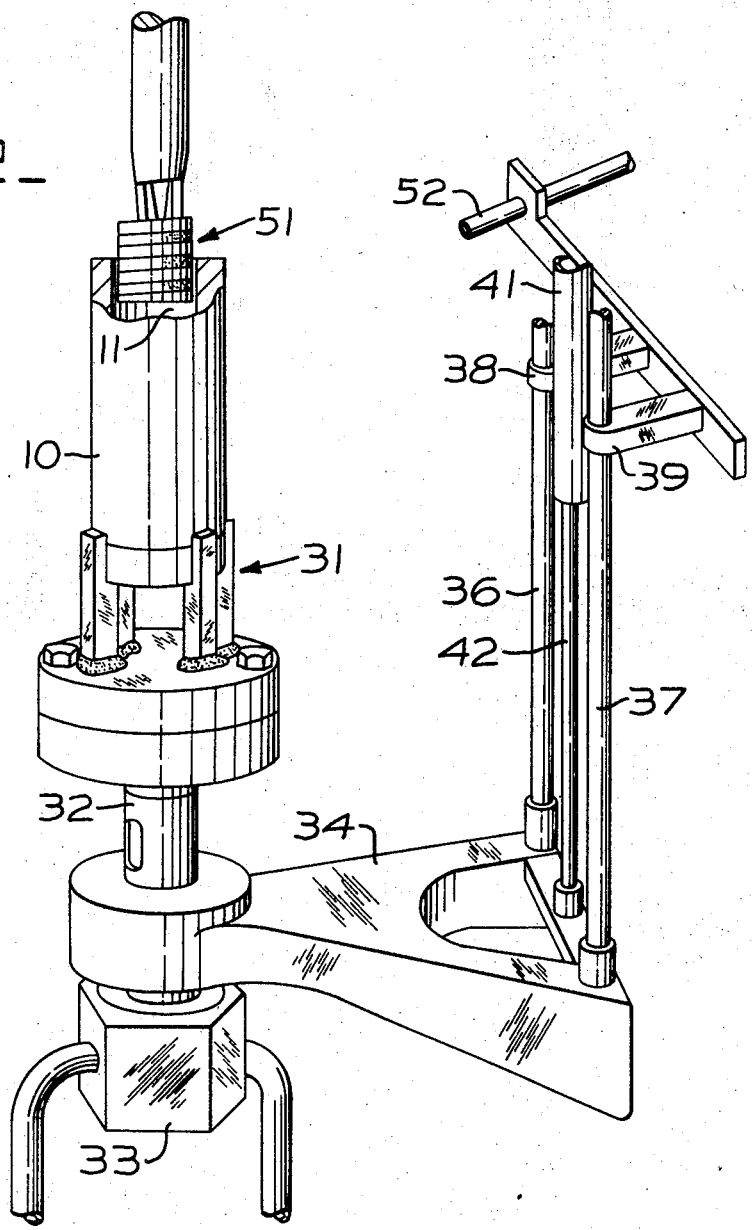

3,567,529
DIFFERENTIALLY TREATED TRACK BUSHING
Robert D. Burtnett, Chillicothe, Ill., assignor to Caterpillar Tractor Co., Peoria, Ill.
Filed Mar. 3, 1969, Ser. No. 803,638
Int. Cl. C21d 1/00
U.S. Cl. 148—148                 17 Claims

ABSTRACT OF THE DISCLOSURE

A cylindrical bushing having a longitudinal bore therethrough, the outer diameter of the bushing being hardened to resist wear with the inner diameter of the bushing being differentially tempered with a reduced hardness relative to the outer diameter in order to resist shock and the development of cracks.

Figure 1:
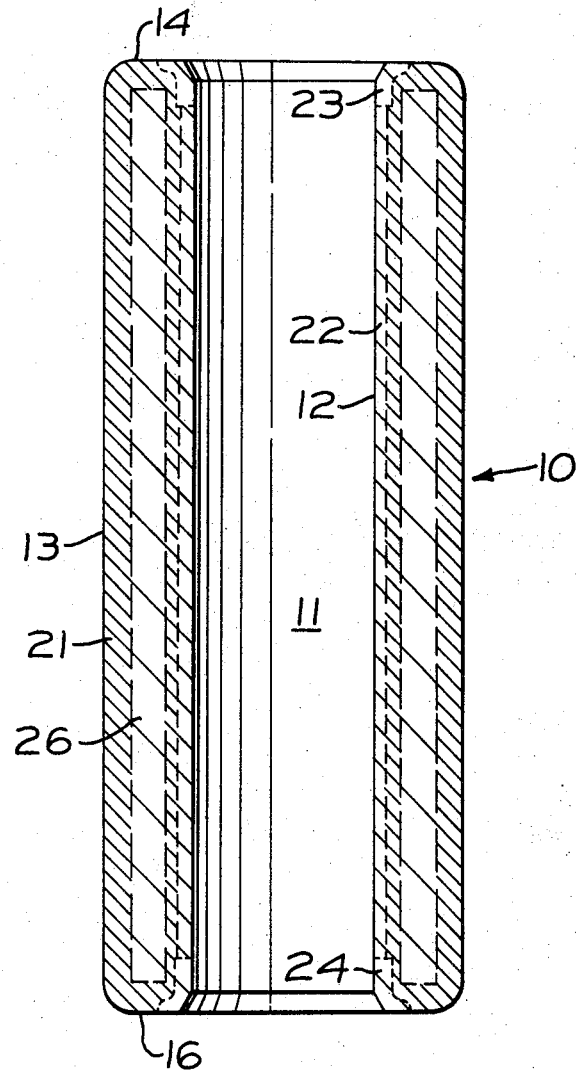

A method of manufacturing the above bushing comprising the steps of forming the bushing, hardening at least the outer diameter of the bushing, and then differentially tempering the inner diameter to a substantially reduced hardness relative to the outer diameter.

---

The present invention relates to a differentially treated bushing, and more particularly to the differential tempering of a track pin bushing.

Advantages of the present invention are particularly apparent in connection with the track pin bushing of an endless track. An endless track for track-type vehicles comprises a plurality of track shoes pivotally connected by means of pins. It is conventional practice to provide bushings within which the pins rotate or pivot. Each track shoe is thereby connected and the track is articulated. Such pin bushing connecting linkages are in universal use on track-type vehicles, and many examples of these linkages have been disclosed in the prior art.

The track mechanism, and especially the pin bushing, is subject to very severe strains and stresses due to the constant pivotal movement under heavy loading conditions. The bushings are therefore subject to rapid wear so that frequent repair or replacement is commonly required.

In the prior art, such bushings are carburized, heated and quenched or otherwise treated to have a high hardness, wear resistant surface on their outer diameter. Since all of the surfaces of the bushing are conventionally subject to the same treatment, the inner diameter of the bushing thus also has a high hardness finish. This has led to a particular problem which is a common source of failure in bushings employed for example in track joints of the type described above. Interaction between the pin and the inner circumferential surface of the bushing tends to develop cracks in the bushing which may ultimately cause its failure.

Accordingly, it is an object of the present invention to provide a bushing which overcomes problems of the type described above.

It is also an object to provide a method for manufacturing such a bushing.

It is a further object of the invention to provide a bushing and a method of manufacturing the bushing wherein differential tempering of the inner circumferential bushing surface is employed to produce a reduced hardness relative to the outer circumferential bushing surface.

Since cracks most commonly develop at the axial ends of the bushing inside diameter, it is a further object to temper the axial ends of the bushing bore surface to a further reduced hardness in order to provide greater resistance to the development and propagation of cracks within the bushing.

It is also an object of the present invention to provide a bushing and a method of manufacturing such a bushing permitting higher surface hardness in selected portions of the bushing than has previously been considered possible.

Other objects and advantages of the invention are made apparent in the following description having reference to the accompanying drawings.

In the drawings:

FIG. 1 is an axially sectioned view of a bushing formed according to the present invention; and FIG. 2 is a fragmentary view, with parts in section, of apparatus for manufacturing a bushing of the type contemplated by the present invention.

A bushing of the type illustrated at 10 in FIG. 1 is formed in a cylindrical configuration having a longitudinal bore 11 defining an inner circumferential surface 12. The bushing is also characterized by an outer circumferential surface 13 extending generally the full length of the bushing with annular surfaces 14 and 16 being formed at the axial ends of the bushing.

The bushing is formed of steel and may, for example, be a high manganese content, plain carbon steel with a composition meeting the specification of S.A.E. 1019 and 1018. The bushing may also be formed from a boron-containing, low-carbon steel. The bushing may be formed, for example, by machining from materials such as those described above.

The bushing is treated by generally conventional hardening techniques followed by a differential treating technique according to the present invention. These techniques are set out in greater detail below. The hardening step, which is particularly applied to the outer circumferential surface 13 of the bushing, develops a high hardness, wear resistant thickness 21 in the bushing adjacent the surface 13. The heating step may be carried out either in an oven or by induction, wherein the entire exposed surfaces of the bushing are subject to the hardening step. The case hardened thickness or portion 21 thus extends to be produced adjacent the axial end surfaces 14 and 16, and the inner cylindrical surface 12 as well as the outer cylindrical surface 13.

The inner circumferential surface 12 of the bushing is designed for greater resistance to shock as well as the development and propagation of cracks, which tend to arise from interaction of the inner circumferential surface 12 with a pin (not shown). The inner circumferential surface 12 is tempered as indicated by the thickness or portion 22 to have a differential and substantially reduced hardness relative to the outer circumferential surface 13. During axial oscillation of the pin within the bushing bore, much larger stresses tend to develop at the axial ends of the bore or inner circumferential surface 12. Accordingly, the inner circumferential surface 12 is differentially tempered so that substantial thicknesses or portions 23 and 24 of the bushing adjacent the axial ends of the inner circumferential surface 12 have a further reduced hardness relative to the tempered portion 22.

A core portion of the bushing, indicated at 26, is enclosed by the hardened bushing portion 21, and is formed to have a generally soft martensitic structure. The hardened portion or thickness 21 of the bushing is generally formed of untempered martensite, while the portions or thicknesses 22 and 23, 24 are also martensite having differentially varying degrees of temper.

To provide a bushing having high hardness and wear-resistant characteristics on its outer circumferential surface 21 together with the shock and crack-resistant characteristics of the inner circumferential surface 12, the untreated core material 26 is selected to have a Rockwell C hardness for example in the approximate range of 30 to 45. The portion or thickness indicated at 21 is then hardened to have a Rockwell C hardness of at least approximately 64, and preferably a Rockwell C hardness within the range of 64 to 66. The tempered thickness or portion indicated at 22 has a relatively reduced hardness, preferably within the Rockwell C range of 56 to 58. The thicknesses or portions 23 and 24 are differentially tempered to have a further reduced hardness, preferably within the Rockwell C range of 40 to 44.

In a method for manufacturing a bushing according to the present invention, the bushing is formed, for example by machining, from a steel composition such as those described above. The bushing is carburized in a convential manner and heated to approximately 1600° F. using a 3000 cycle per second AC source. The bushing is then quenched to produce the desired hardness in the portion or thickness indicated at 21. The steps described immediately above are generally conventional for the construction of such a bushing. However, as indicated above, the high hardness developed after quenching tends to provide a surface which is less resistant to shock and the development of cracks.

The present invention accordingly, contemplates a differential tempering step developing unexpectedly advantageous characteristics for the bushing. In particular, the inner circumferential surface 12 may be treated for resistance to shock and the development and propagation of cracks with the outer circumferential surface 13 having substantially greater hardness and wear-resisting characteristics than was previously considered possible.

In this portion of the process, the bushing is treated by means of apparatus, an example of which is illustrated in FIG. 2. Referring now to FIG. 2, a bushing of the type illustrated in FIG. 1 is secured to an adapter 31 which is concentrically mounted for rotation on the spindle 32 of an air motor 33. The motor and spindle are supported upon a fixture 34 having guide rods 36 and 37 which slidably penetrate brackets 38 and 39. The vertical position of the fixture 34 and accordingly the bushing 10, as viewed in FIG. 2, is controlled by a hydraulic cylinder which is partially indicated at 41 with its rod 42 being secured to the fixture 34.

To differentially temper the inside diameter of the bushing 10, heating means such as the induction heating coil indicated at 51, are separately supported in axial alignment with the bore 11 of the bushing 10. The heating means 51 is preferably a four-turn induction coil having a 450,000 cycle capacity.

In the differential tempering portion of the process, the bushing is secured to the adapter 31 and the air motor 33 is actuated to rotate the spindle 32, the adapter 31 and the bushing 10 at approximately 65 r.p.m. The cylinder 41 is then actuated to advance the fixture 34 and the bushing 10, in an upward direction as viewed in FIG. 2, toward the inductor 51.

The longitudinal rate of travel for the bushing 10 is selected at approximately 30 inches per minute at least when the inductor 51 is within the axially central portions of the bore 11. However, for increased tempering of the end portions of the bore 11, as indicated at 23 and 24 in FIG. 1, the rate of travel for the bushing 10 is selected to include a dwell period of 4 seconds as the inductor 51 enters one end of the bore 11. The travel rate of the bushing 10 also includes a dwell period of approximately 2.2 seconds when the inductor 51 is adjacent the opposite end of the bushing bore and just prior to the inductor passing completely through the bore of the bushing. The dwell period permits additional tempering of the end portions 23 and 24 (see FIG. 1). The difference in duration for the two dwell periods compensates for heat which is conducted ahead of the inductor as it passes through the bushing bore and approaches the opposite end of the bore.

The present invention further contemplates cooling of the outside diameter of the bushing 10 during the present tempering operation to minimize or prevent tempering of the outer circumferential surface 13 of the bushing (see FIG. 1). In the apparatus illustrated in FIG. 2, this cooling step is carried out by directing cooling fluid such as water from a tube indicated at 52 onto the outside diameter of the bushing as its inside diameter is being tempered by the inductor 51.

Bushings selectively and differentially tempered according to the present invention have been subjected to cyclic loading in a manner similar to that encountered in operation of the endless track for a track-type vehicle. From a computer study based on the fatigue testing of such bushings, it has been determined that the average life of the improved bushing is approximately 571,000 cycles. 90% of the bushings may be expected to have an operating life of at least approximately 120,000 cycles. This indicates an improvement of 53% over any previous bushings which were subjected to similar testing.

What is claimed is:

1. A steel bushing having a substantially cylindrical shape with a cylindrical longitudinal bore therethrough integrally forming inner and outer circumferential surface portions with a core portion therebetween, the outer circumferential portion being case hardened to resist wear, the inner circumferential portion being differentially tempered at least over a substantial thickness adjacent its surface to resist shock and development of cracks throughout its inner circumferential surface portion.

2. The invention of claim 1 wherein the tempered inner circumferential portion of the bushing has a tempered martensitic structure and the remainder of the bushing has a substantially untempered martensitic structure.

3. The invention of claim 1 wherein the inner circumferential portion is selectively tempered at its axial ends to a substantially reduced degree of hardness relative to a central longitudinal portion of the inner circumferential surface.

4. The invention of claim 3 wherein the outer circumferential portion has a Rockwell C hardness of at least approximately 64, the central longitudinal inner circumferential portion having a Rockwell C hardness in the approximate range of 56–58, the inner circumferential axial end portions having a Rockwell C hardness of approximately 40–44.

5. The invention of claim 4 wherein the core portion has a Rockwell C hardness of approximately 30–45.

6. The invention of claim 3 wherein the outer and inner circumferential portions of the bushing are case hardened, the inner case hardened circumferential portion being differentially tempered at least over a substantial circumferential thickness adjacent its surface.

7. The invention of claim 1 wherein the bushing is a track pin bushing.

8. The invention of claim 7 wherein the bushing is formed of low carbon steel.

9. In a method of manufacturing a cylindrical bushing, the steps comprising:
    forming a cylindrical bushing having an axial bore therethrough from steel,
    hardening portions of substantial thickness adjacent at least the outer circumferential surface and the axial end surfaces to a Rockwell C hardness of at least approximately 64, and
    differentially and selectively tempering portions of substantial thickness adjacent the inner circumferential surface of the bushing to a substantially reduced hardness relative to the outer circumferential surface portion.

10. The invention of claim 9 wherein the bushing is formed from a material selected from the class consisting of high manganese content, plain carbon steel and boron containing, low carbon steel.

11. The invention of claim 9 wherein the step of hardening is applied to the entire bushing surface including its inner and outer circumferences and its axial ends.

12. The invention of claim 9 wherein axial end portions of the inner circumferential bushing surface are selectively tempered to a further reduced hardness.

13. The invention of claim 9 wherein the step of differential tempering is performed by passing a heating element through the bushing bore at a selected rate of travel.

14. The invention of claim 13 wherein the heating element is an induction heating coil.

15. The invention of claim 13 wherein the rate of travel of the heating element through the bushing bore includes a dwell period adjacent each axial end of the bushing bore.

16. The invention of claim 15 further comprising the step of relatively cooling the outer circumferential bushing surface during differential tempering of its inner circumferential surface.

17. The invention of claim 16 wherein the step of cooling employs the contacting of cooling fluid with the outer circumferential surface of the bushing.

References Cited

UNITED STATES PATENTS 3,227,586   1/1966   Spencer _____ 148—148

RICHARD O. DEAN, Primary Examiner

U.S. Cl. X.R.

148—36, 39, 150, 154